United States Patent [19]
Loughridge et al.

[11] 3,832,124
[45] Aug. 27, 1974

[54] PHOTOFLASH LAMP

[76] Inventors: Frederick Loughridge, 10 Goldfinch Way, Ipswich; Frederick Koury, 26 Eastern Ave.; Warren Hay, 399 Asbury St., both of Hamilton, all of Mass.

[22] Filed: Oct. 2, 1972

[21] Appl. No.: 294,308

[52] U.S. Cl. .................................. 431/93, 65/59
[51] Int. Cl. ............................................ F21k 5/02
[58] Field of Search ............ 431/93, 94, 95; 29/447; 65/59

[56] References Cited
UNITED STATES PATENTS

| 831,396 | 9/1906 | Whitney | 65/59 |
| 1,294,466 | 2/1919 | Houskeeper | 65/59 |
| 1,653,380 | 12/1927 | Ulrey | 65/59 |
| 1,727,755 | 9/1929 | Dickinson | 29/447 |
| 3,506,385 | 4/1970 | Weber | 431/95 |
| 3,511,586 | 5/1970 | Kopelman et al. | 431/93 |
| 3,514,243 | 5/1970 | Hay et al. | 431/93 |
| 3,540,820 | 11/1970 | Shaffer et al. | 431/93 |
| 3,600,120 | 8/1971 | Kopelman | 431/93 |
| 3,623,196 | 11/1971 | Bongehaar et al. | 29/447 |
| 3,645,663 | 2/1971 | Shaffer | 431/93 |
| 3,676,043 | 7/1972 | Anderson et al. | 431/93 |

Primary Examiner—Carroll B. Dority, Jr.
Attorney, Agent, or Firm—Edward J. Coleman

[57] ABSTRACT

A percussive-type photoflash lamp having an envelope comprised of a glass having a low coefficient of thermal expansion and a depending metal primer tube which is sealed to the glass envelope in a manner placing the glass under compression.

6 Claims, 4 Drawing Figures

PATENTED AUG 27 1974 3,832,124

PHOTOFLASH LAMP

BACKGROUND OF THE INVENTION

This invention relates to the manufacture of photoflash lamps and particularly those of the percussive type.

Generally speaking a percussive-type photoflash lamp comprises an hermetically sealed, light-transmitting envelope containing a source of actinic light and having a primer secured thereto. More particularly, as described in U.S. Pat. No. 3,535,063, the percussive flashlamp may comprise a length of glass tubing constricted to a tip at one end and having a coaxially disposed metal primer tube sealed in the other end. The glass tubing defines the lamp envelope and contains a combustible, such as shredded zirconium foil, and a combustion-supporting gas, such as oxygen. To complete the primer structure, a wire anvil coated with a layer of fulminating material is coaxially disposed within the primer tube. Typically, the envelope is comprised of G-1 type soft glass having a coefficient of thermal expansion within the range of 85 to 95 $\times 10^{-7}$ per °C between 20°C and 300°C, and the primer tube is formed of a metal having a similar coefficient of thermal expansion so as to provide a match seal.

Operation of the percussive type photoflash lamp is initiated by an impact onto the tube to cause deflagration of the fulminating material up through the tube to ignite the combustible disposed in the lamp envelope and, thus, flash the lamp. During lamp flashing, the glass envelope is subject to severe thermal and mechanical shock due to hot globules of metal oxide impinging on the walls of the lamp. As a result, cracks and crazes occur in the glass and, at higher internal pressures, containment becomes impossible. In order to reinforce the glass envelope and improve its containment capability, it has been common practice to apply a protective lacquer coating on the lamp envelope by means of a dip process. To build up the desired coating thickness, the glass envelope is generally dipped a number of times into a lacquer solution containing a solvent and a selected resin, typically cellulose acetate. After each dip, the lamp is dried to evaporate the solvent and leave the desired coating of cellulose acetate, or whatever other plastic resin is employed.

In the continuing effort to improve light output, higher performance flashlamps have been developed which contain higher combustible fill weights per unit of internal envelope volume, along with higher fill gas pressures. In addition, the combustible material may be one of the more volatile types, such as hafnium. Such lamps, upon flashing, appear to subject the glass envelopes to more intense thermal shock effects, and thus require stronger containment vessels. One approach to this problem has been to employ a hard glass envelope, such as the borosilicate glass envelope described in U.S. Pat. No. 3,506,385, along with a protective dip coating. More specifically, this patent describes an electrically ignitable lamp having in-leads of a metal alloy such as Kovar secured by an internal expansion match seal in a glass envelope having a coefficient of thermal expansion in the range of 40 to 50 $\times 10^{-7}$ per °C. Type 7052 glass is mentioned as typical. The patent imposes a minimum of 40 $\times 10^{-7}$ per °C on the coefficient of thermal expansion of the glass to assure the necessary match seal with the Kovar in-leads. Further, it is theorized that glass in this thermal expansion range provides a more beneficial mode of fracture which results in a delay in crack time after flashing. More specifically, fracture of the glass is delayed to a time when the pressure in the lamp has been reduced to a point where containment is more readily assured.

We have discovered that by using glasses having an even lower thermal expansion than that specified in the aforementioned U.S. Pat. No. 3,506,385 the flashlamp envelope can be made even more resistant to thermal shock and thereby delay crack time even further. Alternatively, the use of lower thermal expansion glass provides a lamp capable of higher thermal loadings, as the glass surface stresses $\sigma$ are proportional to the thermal expansion $\alpha$ of the glass. In particular, we have found that glasses having a coefficient of thermal expansion within the range of 30 to 40 $\times 10^{-7}$ per °C between 0°C and 300°C are particularly suitable for improving the containment of flashlamp envelopes. Hereinafter, such glass will be referred to a "low-expansion glass". Of course, fused quartz has a very low coefficient of thermal expansion, in the order of 4 $\times 10^{-7}$ per °C, but it is somewhat costly for this application.

In attempting to use a low-expansion glass envelope in the above-described percussive flashlamp structure, however, a sealing problem arises as the commercially suitable metals for the primer tube all have a substantially higher coefficient of thermal expansion than the glass and, therefore, are not suitable for providing a match seal. More specifically, referring to the envelope primer assembly of FIG. 1, in the above-referenced prior art percussive flashlamp, the metal primer tube 10 is secured to the glass envelope 12 by means of an internal expansion match seal. If envelope 12 is formed of low-expansion glass (e.g., a glass having a thermal expansion of about 33 $\times 10^{-7}$ per °C) and tube 10 is formed of a low thermal expansion metal alloy such as Kovar (having a minimum thermal expansion of about 45 $\times 10^{-7}$ per °C), there will be a mismatch between the mating materials and, upon cooling, the Kovar will contract faster than the glass. In this event, tube 10 will continue to adhere to envelope 12, but the faster contraction of the metal will place the adjacent glass area under tension, as illustrated by the arrows. This results in an unacceptably weak seal area, as the strength of glass is reduced in tension.

SUMMARY OF THE INVENTION

In view of the foregoing, it is an object of the present invention to provide a percussive-type photoflash lamp having an improved containment vessel.

Another object of the invention is to provide an improved glass-to-metal seal for a percussive flashlamp.

A principal object is to provide a percussive-type photoflash lamp having a low-expansion glass envelope and a strong glass-to-metal seal between the envelope and primer tube.

These and other objects, advantages and features are attained, in accordance with the invention, by shaping the metal primer tube so that it bears against the exterior surface of a glass envelope of lower thermal expansion, whereby the seal area of the glass is placed under compression upon cooling from the sealing process. Under a compressive strain, glass is made considerably stronger; hence, even though the materials are mismatched with respect to thermal expansion, a strong seal results. By use of this compression seal, a significantly improved containment vessel may be provided for a percussive flashlamp by employing a low-expansion glass, such as type 7740, for the envelope and a metal, such as 42 nickel-iron alloy, for the primer tube.

BRIEF DESCRIPTION OF THE DRAWINGS

This invention will be more fully described hereinafter in conjunction with the accompanying drawings, in which.

DESCRIPTION OF PREFERRED EMBODIMENT

Figure 2:
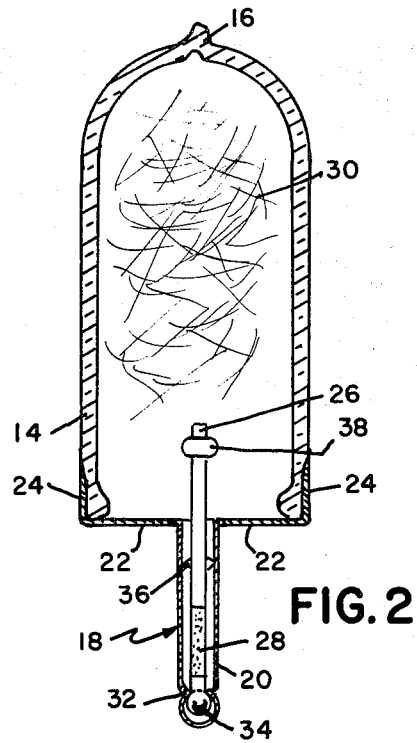
FIG. 2 is an enlarged sectional elevation of a percussive type photoflash lamp having a compression seal between the envelope and primer according to the invention.

Referring to FIG. 2, a percussive lamp according to the invention comprises a length of glass tubing defining an hermetically sealed lamp envelope 14 constricted at one end to define an exhaust tip 16 and having a primer 18 secured at the other end thereof. Preferably, the glass of envelope 14 is selected to be a low-expansion glass, such as Corning Glass Works 7740 type hard glass, which has a mean coefficient of thermal expansion of about $32.5 \times 10^{-7}$ per °C between 0°C and 300°C, and a composition which is approximately: 81% $SiO_2$, 2% $Al_2O_3$, 13% $B_2O_3$, and 4% $Na_2O$.

The primer 18 comprises a thin metal shell having a tubular portion 20 which is closed at one end, a flat base portion 22 extending radially outward from the open end of the tubular portion 20, and a tubular rim portion 24 extending coaxially upward from base 22 and firmly sealed to the lower exterior surface of the glass envelope 14. The metal comprising the primer shell portions 20, 22 and 24 is selected to have a significantly higher coefficient of thermal expansion than the glass envelope. For example, a metal suitable for use with the above-mentioned type 7740 glass is that known as 42 nickel-iron alloy; this is an alloy of about 42% Ni and 58% Fe, having a mean coefficient of thermal expansion of about $48.8 \times 10^{-7}$ per °C between 25°C and 300°C.

The primer further includes a wire anvil 26 coaxially centered within the tube 20 and coated with a charge of fulminating material 28. A combustible 30, such as filamentary zirconium or hafnium, and a combustion-supporting gas, such as oxygen, are disposed within the lamp envelope, with the fill gas being at a pressure of greater than one atmosphere. The exterior surface of the glass envelope 14 is covered with a suitable plastic coating, such as cellulose acetate.

The wire anvil 26 is held in place by a circumferential indenture 32 which loops over the head 34, or other suitable protuberance, at the lower extremity of the wire anvil. Additional means, such as lobes 36 on the wire anvil 26, for example, may also be used in stabilizing the wire anvil supporting it substantially coaxial within the tube 20 and insuring clearance between the fulminating material 28 and the inside wall of tube 20. A deflector-shield 38 which may be a bead of refractory material or formed of metal, is attached to the wire anvil just above the inner mouth of the tube 20.

Typically, the lamp envelope has an internal diameter of less than one-half inch, and an internal volume of less than 1 cc., although the present invention is equally suitable for application to larger lamp sizes.

Figure 1:
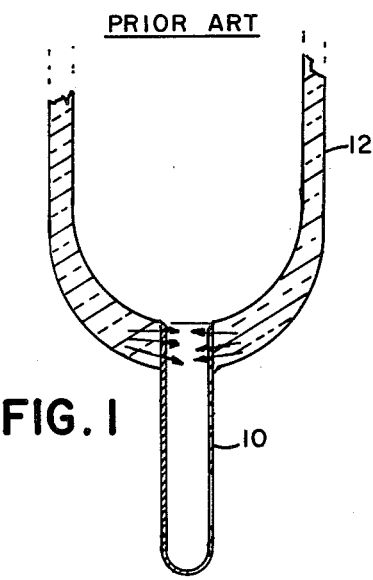
FIG. 1 is an enlarged fragmentary cross-section illustrating the glass-to-metal seal of a prior art percussive flashlamp to which previous reference has been made.

Operation of the percussive-type lamp of FIG. 1 is initiated by an impact onto tube 20 to cause deflagration of the fulminating material 28 up through the tube 20 to ignite the combustible 30 disposed within the lamp envelope.

Figure 3:
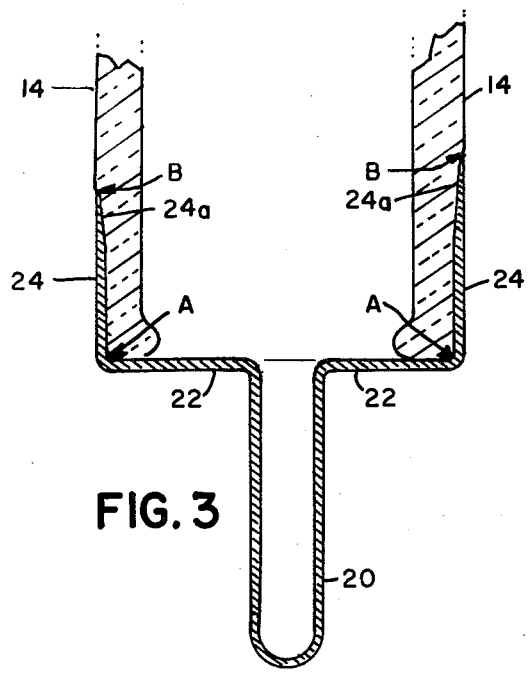
FIG. 3 is an enlarged fragmentary cross-section illustrating the glass-to-metal seal of the flashlamp of FIG. 1; and, FIG. 4 is an enlarged fragmentary cross-section illustrating an alternative glass-to-metal seal.

The region of the glass-to-metal seal will now be described with particular reference to the enlarged sectional view of FIG. 3, which shows the lower portion of the lamp prior to insertion of the anvil and fill material. As described above, the metal of the primer shell 20-24 has a significantly greater coefficient of thermal expansion than the low expansion glass; e.g., in the case of the above-mentioned 42 nickel-iron alloy and type 7740 hard glass, the ratio is about 49 to 33. During assembly, an end of the glass tubing 14 is inserted within the tubular metal rim 24 and seated against the metal base 22. The glass-to-metal interface is then hermetically sealed by a heating process. A torch is applied to start the seal between the internal surface of metal rim 24 and the lower edge of the glass tubing denoted by the points A. With the seal made at A, pressure is applied within the tube 14 and the glass is blown out into firm contact with the metal rim 24 as the heat from the torch is raised above point A. The glass and metal are rotated while heat is being applied with a flame.

Due to the aforementioned thermal expansion mismatch between the materials, the metal rim 24 will contract, or shrink, more than the glass tubing upon cooling from the sealing temperature, thereby placing the glass under compression. As is well known, glass is extremely strong in compression; however, at the edge B of the seal, there will be a tension strain in the glass where the glass goes from compression to an area of essentially no strain. To maintain this tension strain within safe limits, the metal rim 24 is tapered to a feather-edge in the area 24a to distribute the strain over a relatively wide area of glass.

As a result, a strong glass-to-metal seal is provided between a low-expansion glass envelope 14 and the primer tube, or shell, 20–24 to provide a significantly improved containment vessel for a percussive flashlamp. The hermetically sealed, low-expansion glass envelope provides much higher resistance to thermal shock, thereby permitting greater loading of the lamp with combustible material and oxygen to provide increased light output.

Figure 4:
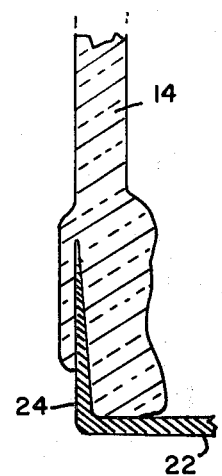

FIG. 4 shows an alternative seal which may be made by blowing the bulb out slightly in the area above the metal edge, pushing the glass and metal toward one another and paddling the glass around the tapered metal edge. This will further strengthen the seal at the point of tension strain.

Although the invention has been described with respect to specific embodiments, it will be appreciated that modifications and changes may be made by those skilled in the art without departing from the true spirit and scope of the invention. In the low-expansion-envelope embodiments, glass types other than 7740, which have a mean coefficient of thermal expansion within the range of about 30 to $40 \times 10^{-7}$ per °C between 0°C and 300°C, may be employed, such as Corning Glass Works types 7760, 7250 and 7070, and generally accepted equivalents. Glasses of this type are borosilicate glasses having approximate compositions in the following ranges: 71% to 81% $SiO_2$, 12% to 26% $B_2O_3$, 0.5% to 5% $Na_2O$, and 1% to 3% $Al_2O_3$. Also, the primer tube, or shell, 20–24 may be formed of metals other than 42 nickel-iron alloy, such as the alloys of iron, nickel and cobalt known as Kovar, Rodar, etc. Further, the described compression seal may be applied to percussive flashlamps employing higher expansion glasses, or even soft glass, to correct similar mismatches.

What I claim is:

1. A percussive-type photoflash lamp comprising:
an hermetically sealed envelope composed of a glass having a mean coefficient of thermal expansion between 0°C and 300°C about in the range of 30 to $40 \times 10^{-7}$ per °C;
a quantity of combustible material located within said envelope;
a combustion-supporting gas in said envelope;
and a primer secured to and extending from one end of said envelope and in communication therewith, said primer including a tubular metal piece hermetically sealed about the otherwise open end of said glass envelope and thermally fused thereto, and a body of fulminating material located in said tubular metal piece, said tubular metal piece being composed of an alloy comprising nickel and iron and having a coefficient of thermal expansion which is higher than that of said glass envelope whereby said glass is under compression at the seal of said metal piece to said envelope.

2. A lamp according to claim 1 wherein: said otherwise open end of said glass envelope is substantially tubular; said tubular metal piece has a tube portion which is closed at one end, a flat base portion extending radially outward from the open end of said tube portion, and a tubular rim portion extending from said base portion away from said tube portion and coaxial therewith; and said tubular end of said glass envelope is disposed within the tubular rim portion of said metal piece and secured thereto in a mismatched compression seal.

3. A lamp according to claim 2 wherein the rim portion of said metal piece is tapered to a feather-edge to distribute the tension strain in the glass at the boundary of the compression zone over a relatively wide area.

4. A lamp according to claim 2 wherein said metal piece alloy comprises the following constituents in about the proportions stated by weight: 42% Ni and 58% Fe.

5. A lamp according to claim 2 wherein said tubular metal piece is composed of an alloy comprising iron, nickel and cobalt.

6. A lamp according to claim 2 wherein the primer further includes a wire anvil disposed within and substantially coaxial with the tube portion of said metal piece with said fulminating material being disposed thereon intermediate the ends thereof, and a deflector-shield disposed on said wire anvil immediately above the open end of the tube portion of said metal piece.

* * * * *

UNITED STATES PATENT OFFICE
CERTIFICATE OF CORRECTION

Patent No. 3,832,124           Dated AUGUST 27, 1974

Inventor(s) FREDERICK LOUGHRIDGE, FREDERIC KOURY, WARREN HAY

It is certified that error appears in the above-identified patent and that said Letters Patent are hereby corrected as shown below:

[76] In the Title:

Change: Frederick Loughridge, 10 Goldfinch Way, Ipswich; Frederic(k) Koury, 26 Eastern Ave.; Warren Hay, 399 Asbury St., (both of) Hamilton, all of Mass.

To: Frederick Loughridge, 10 Goldfinch Way, Ipswich; Frederic Koury, 26 Eastern Ave., (-Lexington-); Warren Hay, 399 Asbury St., Hamilton, all of Mass.

[73] Add: (-Assignee: GTE Sylvania Incorporated, Danvers, Mass.-)

Signed and sealed this 10th day of December 1974.

(SEAL)
Attest:

McCOY M. GIBSON JR.
Attesting Officer

C. MARSHALL DANN
Commissioner of Patents